Patented Feb. 6, 1940

2,189,303

UNITED STATES PATENT OFFICE 2,189,303

IMPROVING THE GROWTH OF MUSHROOM MYCELIUM

Benjamin B. Stoller, Coatesville, Pa., assignor to Louis F. Lambert, Coatesville, Pa.

No Drawing. Application April 22, 1937, Serial No. 138,368

4 Claims. (Cl. 71—5)

This invention relates to a method of treating substrate for improving the growth of the mushroom mycelium both in the manufacture of spawn and in the production of mushroom sporophores.

By the method in accordance with this invention the mycelium grows more abundantly, is denser and more vigorous because the substrate is made more suitable for growth.

As a result of this invention it is now possible for the mycelium to grow completely through the sterilized substrate in the production of spawn; only the white mycelial growth is evident, so that the spawn bottle has a white, milky appearance, whereas in the ordinary spawn bottle the spawn appears reddish, speckled with white, on account of only a partial growth of the mycelium through the substrate. Furthermore, strand growth of spawn is entirely eliminated.

By the method in accordance with this invention, the mycelium grows more quickly and more vigorously in the mushroom bed, as observed by the larger concentration of carbon dioxide evolved, produces mushrooms earlier, and gives a larger yield of mushrooms.

It is known that the mushroom mycelium produces organic acids, such as oxalic and carbonic acids, when it grows through the substrate. If these acids are not removed, as by precipitation, oxidation or gaseous evolution, they will soon make the medium or substrate unsuitable for further mycelial growth. If the mycelial growth on ordinary washed and sterilized composted manure is observed carefully, it may be seen that the mushroom hyphae have only partially penetrated this medium and that the manure has assumed a reddish hue. This red color has been definitely correlated with a decrease in the pH value of the substrate; that is, the H ion concentration has been increased by some acids formed in the course of the growth of the mushroom mycelium, and the pH value is correspondingly decreased. These acids, which are either formed by the mycelium directly or are liberated as the result of the utilization of certain cations and the liberation of free anions, make the substrate unfavorable for the complete penetration by the mushroom hyphae. In such case, the substrate appears reddish and speckled with the white mycelium instead of being completely white and dense, as would have been the case if the mycelium had completely or more completely penetrated the substrate and no free acids prevailed.

The present invention therefore comprises the method and means whereby this acid, normally arising from the mycelial growth, may be neutralized, without, at the same time, injuriously affecting the substrate, or making it unsuitable for the initial growth of the spawn.

It was found that by addition to the substrate of an alkaline earth substance, such as Ca hydroxide or, to a less extent, Mg hydroxide in quantity sufficient to neutralize the said acid condition of the substrate, would make the substrate injurious to the initial growth of the spawn. For example, if 4% to 6% lime is added to washed horse manure, with a pH of 7.6, the pH of the mixture after sterilization becomes 8.8 to 9.4 as shown in Table 1. At this high pH value the mycelium usually fails to grow.

In Table 1 is shown some data on the effect of the lime with or without the addition of a buffering salt on the pH of washed horse manure. The manure used in this instance was only slightly composted and so had an initial pH of 7.6, instead of the usual pH 8.0 of manure better composted. But even at this low initial pH, the pH of the manure rose to 8.3 when only 1% lime was added. When 4% to 6% lime is added, that is, the quantity of lime necessary for the most abundant growth of the mycelium, the pH of the substrate becomes entirely unsatisfactory for the growth of the mycelium. However, when such chemicals as Al, Fe, or Mn are added, the pH may be adjusted as desired, irrespective of how much lime is added. If, instead of adding equal amounts of the lime and the Al-Fe or Mn salts, more of the latter are added, the pH may be held the same as that for the check.

Al, Fe, Mn, Cr, and Zn are not the only elements of salts which will antagonize or buffer the effect of alkali or the alkaline earth elements. Any salt or substance which will increase the H ion concentration of the substrate and not in itself be poisonous to the mushroom mycelium may be used. These salts, while they are unfavorable to the growth of the mycelium when used by themselves, alleviate the toxic effect of the caustic alkali and promote the very best growth of the mycelium in the presence of the alkaline earth elements. The benefits derived from the common practice of adding soil to manure, when composting, may be to supply such elements as Al, Fe, Mn, Ca, Mg, etc. present in the soil. According to my method these elements are deliberately added in a highly available form. density of the mycelial growth, or the completeness of the penetration of the substrate seems to depend rather on the presence of certain substances, as shown by my method, which will precipitate, oxidize, or prevent metabolic end-products or deleterious transformations in the sub- TABLE 1.—*The effect of hydrated lime with and without the addition of aluminum, iron, and manganese on the pH of washed composted horse manure, pH 7.6, after the mixture of chemicals and manure had been sterilized at 15 lbs. pressure for 4 hours. The pH was determined with the glass electrode.*

| Hydrated lime | | | Lime plus Al and Fe salts | | | | | Lime plus $MnSO_4$ | | | |
|---|---|---|---|---|---|---|---|---|---|---|---|
| | | | | | Lime | | | | Lime | | |
| Grams | Percent on dry basis | pH | $FeSO_4$ grams | $Al_2(SO_4)_3$ grams | Grams | Percent on dry basis | pH | $MnSO_4$ grams | Grams | Percent on dry basis | pH |
| 3 | 1 | 8.3 | 2.5 | 0.5 | 3 | 1 | 8.0 | 3 | 3 | 1 | 7.8 |
| 6 | 2 | 8.4 | 5.0 | 1.0 | 6 | 2 | 8.0 | 6 | 6 | 2 | 8.0 |
| 9 | 3 | 8.6 | 7.5 | 1.5 | 9 | 3 | 8.2 | 9 | 9 | 3 | 8.2 |
| 12 | 4 | 8.8 | 10.0 | 2.0 | 12 | 4 | 8.2 | 12 | 12 | 4 | 8.2 |
| 15 | 5 | 9.0 | 12.5 | 2.5 | 15 | 5 | 8.3 | 15 | 15 | 5 | 8.2 |
| 18 | 6 | 9.4 | 15.0 | 3.0 | 18 | 6 | 8.5 | ---- | ---- | ---- | --- |

All chemicals except Mn ($MnSO_4$, $2H_2O$, C. P.) were of the technical grade as used in actual plant operations.

strate during the course of growth. There may, however, exist certain optimum pH values for a specific medium, especially in the absence of a TABLE 2.—*The effect of chemicals on the pH, density, and extent of mycelial growth. The pH was measured with the glass electrode. The extent of growth was estimated by measuring with a flexible ruler the surface of the spawn bottle in sq. cm. where the mycelium had not grown; Zero would indicate a full grown bottle, and Fifty a half grown bottle. Growth was measured after 27 days.*

| No. of bottle | Salts added to washed manure, percent dry basis | | pH before inoculation | pH of spawn | Density of growth on basis of 10 | Extent of growth on basis of 100 |
|---|---|---|---|---|---|---|
| | Salts | Percent | | | | |
| | Check | | 8.0 | 6.4 | 3 | 8 |
| 1 | Hydrated lime | 2 | 8.6 | 6.8 | 4 | 50 |
| 2 | do | 4 | 8.8 | 7.2 | 6 | 50 |
| 3 | do | 6 | 9.1 | | | No growth |
| 4 | Calcium carbonate, U. S. P. | 6 | 8.3 | 7.2 | 5 | 3 |
| 5 | do | 8 | 8.3 | 7.2 | 5 | 3 |
| 6 | Calcium sulphate, C. P. | 4 | 7.0 | 5.7 | 3 | 0 |
| 7 | do | 6 | 6.9 | 5.7 | 3 | 0 |
| 8 | Calcium nitrate, tech. | 2 | 7.1 | 5.9 | 2 | 5 |
| 9 | do | 3 | 6.9 | 5.9 | 2 | 5 |
| 10 | Magnesium sulphate, U. S. P. | 4 | 7.2 | 6.2 | 3 | 0 |
| 11 | Ferric sulphate, C. P. | 2 | 7.1 | 6.1 | 2 | 0 |
| 12 | do | 2 | | | | |
| | Lime | 2 | 7.6 | 6.4 | 7 | 0 |
| 13 | Ferric sulphate, C. P. | 2 | | | | |
| | Lime | 4 | 8.3 | 6.7 | 8 | 1 |
| 14 | Aluminum sulphate, tech. | 5 | | | | |
| | Lime | 6 | 8.5 | 6.7 | 10 | 3 |
| 15 | Aluminum sulphate, tech. | 1 | | | | |
| | Ferrous sulphate, tech. | 1 | | | | |
| 16 | Lime (70 percent CaO) tech. | 3 | 8.2 | 6.7 | 8 | 2 |
| | Aluminum sulphate, tech. | 3 | | | | |
| | Ferrous sulphate, tech. | 3 | | | | |
| 17 | Lime | 7 | 8.4 | 6.7 | 10 | 0 |
| | Aluminum sulphate | 3 | | | | |
| | Ferrous sulphate | 3 | | | | |
| 18 | Lime | 8 | 8.5 | 6.7 | 10 | 20 |
| | Aluminum sulphate | 3 | | | | |
| | Ferrous sulphate | 3 | | | | |
| 19 | Lime | 9 | 8.7 | 6.8 | 10 | 50 |
| | Aluminum sulphate | 4 | | | | |
| | Ferrous sulphate | 1 | | | | |
| 20 | Lime | 6 | 8.6 | 6.6 | 10 | 0 |
| | Aluminum sulphate | 1 | | | | |
| | Ferrous sulphate | 4 | | | | |
| 21 | Lime | 5 | 8.6 | 6.6 | 10 | 0 |
| 22 | Zinc sulphate, C. P. | 4 | 6.9 | 6.0 | 1 | 25 |
| | do | 6 | | | | |
| 23 | Lime | 6 | 8.6 | 6.5 | 7 | 33 |
| | Aluminum sulphate, tech. | 2 | | | | |
| | Potassium carbonate, C. P. | 1 | 7.4 | 6.4 | 3 | 2 |
| 24 | Aluminum sulphate | 2 | | | | |
| | Potassium carbonate | 2 | 8.0 | 6.4 | 3 | 20 |
| 25 | Aluminum sulphate | 2 | | | | |
| | Potassium carbonate | 3 | 8.1 | | | Slight growth |
| 26 | do | 0.7 | 8.2 | 6.5 | 3 | 22 |
| 27 | do | 1.3 | 8.8 | | | No growth |

It has not been possible to set any pH or any narrow range as the optimum value for mycelial growth in the presence of a sufficiency of such substances as a calcium salt properly buffered. The mushroom mycelium has been found to grow rapidly anywhere on the pH range from 6.9 to 8.6. But the abundancy of the hyphae, the sufficiency of a calcium salt properly buffered. It has been reported in the literature (Frear, Styer, Haley-Pl. physiol. 3: 91-4, 1928) that the best growth (i. e. most rapid) obtained in cultures was nearest to a pH of 6.0. Their medium contained a preponderance of potassium salts and only traces of calcium and iron salts. It may be noted in Table 2 that potassium carbonate is especially toxic to mycelial growth and that even though the pH was 8.1 in bottle #25, the presence of 3% potassium carbonate produced only a slight growth. Any correlation of pH and rapidity of growth must take into consideration the presence or absence of certain constituents in the substrate.

Yet there may be some basis for deciding what pH is most satisfactory. For example, I have determined that the pH of the mycelium both in the stem and in the cap of the mushroom is 6.6 to 6.7 by both the quinhydrone and the glass electrodes. It is not possible to determine the pH of the mycelium in the substrate apart from the substrate, but it would not be far fetched to suppose that the pH of the mycelium in the substrate is the same as that of the mycelium in the stem and cap of the mushroom, since there is so little differentiation of tissue in this fungus.

It may be noted in Table 2 that where the mycelial growth was most dense, the pH of the spawn was in almost every case 6.6 to 6.7. Other conditions may bring about a pH of this range in the spawn. But where the spawn is most dense and the pH is in this range, such spawn may be considered as of the best quality. The pH to be desired in a substrate would then be the one which would result in a pH of 6.6 to 6.7 in the spawn, because that pH range exists in the mycelium of the mushroom itself.

The beneficial effects of the salts of such elements as Al, Fe, Cr, Mn, etc. is explained as antagonizing or buffering the effect of the alkali and alkali earth elements. The addition of such alkalies as Ca and Mg is to precipitate the acidity caused by the growth of the mycelium. Although this explanation may not be entirely correct, the benefits to be derived and the practicality of their utilization have been realized.

The heavy incrustation of crystals on the hyphae may be observed when a combination of salts, as disclosed in my method is employed, whereas there is comparatively no such incrustation and precipitation of crystals in the check bottles where no salts were added. It might be contended that this crystalline incrustation is largely responsible for the milky white, opaque appearance of the spawn prepared by my method, and not a more abundant mycelial growth and a more complete penetration of the substrate. However, it has been determined that when this combination of salts are added to manure in the ordinary mushroom bed, the carbon dioxide evolution is three times as great as where no salts have been added. A greater evolution of carbon dioxide can only be interpreted as caused by a more vigorous growth and a better penetration of the substrate. According to some authorities on the biochemistry of other fungi (R. A. Steinberg, Bull. Torrey Club, 61: 241-8, 1934) the translucent and slimy hyphae may be associated with lack of growth due to poor nutrition and to injury by chemicals, and an opaque growth associated with better nutrition. Furthermore, the yield of mushrooms is very significantly greater from the beds to which salts have been added.

Another benefit to be derived from the employment of a combination of these salts is that no strands develop in the spawn bottle, but are always present in bottles to which no such salts in the proper proportions have been added, especially in the neck of the bottle. Strands develop only when the substrate becomes increasingly unfavorable for mycelial growth. On the other hand, the mycelium in the bottles prepared according to my method is always very fine and very dense.

While these data and experiments were carried out with *Agaricus campestris* L., the method described would improve the mycelial growth of other edible mushrooms. The mineral compositions of the common edible mushrooms are very similar, and their reactivity toward the substrate may also be similar.

By the use of the term "substrate", "medium", "compost", or "bed", I intend to include any development-supporting material or body suitable for the development and growth of mycelium and also of the mushrooms.

What I claim is:

1. The method of treating a mushroom substrate containing a soluble alkali substance sufficient to remove acid conditions arising from mycelial growth, which consists in mixing therewith a salt of a metal selected from the group consisting of Fe, Al, Mn, Cr and Zn in amount sufficient to buffer and prevent the alkali from injuriously affecting the mycelial growth and which will react with said alkali to improve said growth.

2. The method of treating a mushroom substrate containing 4% to 6% of lime to remove acid conditions arising from mycelial growth, which consists in mixing therewith a salt of a metal of the group consisting of Fe, Al, Mn, Cr and Zn in amount sufficient to buffer and prevent the alkali from injuriously affecting the mycelial growth and which will react with said alkali to improve said growth.

3. A substrate for mushroom culture containing a soluble alkali substance sufficient to remove acid conditions arising from mycelial growth, and a salt of a metal selected from the group consisting of Fe, Al, Mn, Cr and Zn in amount sufficient to buffer and prevent the alkali from injuriously affecting the said mycelial growth and to react with said alkali to improve said growth.

4. A substrate for mushroom culture containing 4% to 6% of lime and a salt of a metal selected from the group consisting of Fe, Al, Mn, Cr and Zn in amount sufficient to buffer and prevent the lime from injuriously affecting the said mycelial growth and to react with said lime to improve said growth.

BENJAMIN B. STOLLER.